(12) United States Patent
Yishay

(10) Patent No.: US 9,690,873 B2
(45) Date of Patent: Jun. 27, 2017

(54) SYSTEM AND METHOD FOR BIT-MAP BASED KEYWORD SPOTTING IN COMMUNICATION TRAFFIC

(71) Applicant: Verint Systems Ltd., Herzelia, Pituach (IL)

(72) Inventor: Yitshak Yishay, Revava (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 686 days.

(21) Appl. No.: 14/167,074

(22) Filed: Jan. 29, 2014

(65) Prior Publication Data

US 2014/0222852 A1    Aug. 7, 2014

(30) Foreign Application Priority Data

Jan. 31, 2013   (IL) .......................................... 224525

(51) Int. Cl.
*G06F 17/30* (2006.01)
*H04L 29/06* (2006.01)

(52) U.S. Cl.
CPC .... *G06F 17/30985* (2013.01); *H04L 63/0245* (2013.01); *H04L 63/1408* (2013.01)

(58) Field of Classification Search
CPC .............................................. G06F 17/30985
USPC ......................................................... 707/758
See application file for complete search history.

(56) References Cited

U.S. PATENT DOCUMENTS

| | | |
|---|---|---|
| 5,689,442 A | 11/1997 | Swanson et al. |
| 6,404,857 B1 | 6/2002 | Blair et al. |
| 6,718,023 B1 | 4/2004 | Zolotov |
| 6,757,361 B2 | 6/2004 | Blair et al. |
| 7,216,162 B2 | 5/2007 | Amit et al. |
| 7,466,816 B2 | 12/2008 | Blair |
| RE40,634 E | 2/2009 | Blair et al. |
| 7,587,041 B2 | 9/2009 | Blair |
| 8,296,279 B1 * | 10/2012 | Singh ................ G06F 17/30672 707/706 |
| 8,412,722 B2 * | 4/2013 | Biran ................ G06F 17/30985 706/48 |

(Continued)

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.

(Continued)

*Primary Examiner* — Joshua Bullock
(74) *Attorney, Agent, or Firm* — Meunier Carlin & Curfman

(57) ABSTRACT

Methods and systems for locating occurrences of a search pattern in a body of text. A processor searches the text for one or more occurrences of a pattern. Both the text and the pattern comprise symbols of some alphabet. In preparation for the search, the processor defines a respective bit-map for each alphabet symbol. Using the bit-maps, the processor carries out a highly efficient process of searching the text for occurrences of the pattern. The processor then scans the pattern backwards using the bit-maps, symbol by symbol, attempting to match the symbols of the pattern to the corresponding symbols of the text. If a match is not found, the processor calculates the size of the jump to the next position in the text based on the accumulated results of the evaluations up to the current position.

18 Claims, 6 Drawing Sheets

(56) References Cited

U.S. PATENT DOCUMENTS

| | | | |
|---|---|---|---|
| 8,447,749 B2* | 5/2013 | Biran | G06F 17/30985 706/48 |
| 9,009,089 B1* | 4/2015 | El Defrawy | G06F 21/602 706/18 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2010/0114973 A1* | 5/2010 | Goyal | G06F 17/30985 707/802 |

OTHER PUBLICATIONS

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fox Replay BV, "FoxReplay Analyst," http//www.foxreplay.com, Revision 1.0, Nov. 2007, 5 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 2010, 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

Liu, R-T., et al., "A Fast Pattern-Match Engine for Network Processor-based NIDS," Proceedings of the 20th International Conference on Information Technology (ITCC'04), 2006, 23 pages.

Rohde & Schwarz GmbH & Co. KG, "R&S AllAudio Integrated Digital Audio Software," Product Brochure, Radiomonitoring & Radiolocation, Feb. 2000, 12 pages.

\* cited by examiner

```
1   void YY(char* Pattern, int PatternSize, char* text, int textSize)
2   {
3   // Preprocessing part: (calculating PatternBitMap)
4       int PatternBitMap[256] ;
5       for(int i = 0 ; i < 256 ; i++ )
6           PatternBitMap[i]= -1<< PatternSize ;
7       for(int i = 0 ; i < PatternSize ; i++)
8           PatternBitMap[Pattern[i]] |= 1 << (PatternSize-i-1) ;
9   // Initialize part:
10      int position = PatternSize - 1;
11      int available_end_Match = ~0 ;
12      int checked = 0 ;
13      int jump_size = 0 ;
14      int index = 0 ;
15  // Searching part:
16      while ( (position += jump_size) <= textSize-1 )
17      {
18          available_end_Match &= PatternBitMap[ text[position] ] ;
19          checked |= 1<<index ;
20          while (available_end_Match&1)
21          {
22              if (++index < PatternSize)
23              {
24                  if (!( checked & (1<<index)))
25                  {
26                      available_end_Match &= PatternBitMap[ text[position-index] ]
27                      >> index ;
28                      checked |= 1<<index ;
29                  }
30              }
31              else
32              {
33                  reportMatch(str,text,position-PatternSize+1,j) ;
34                  available_end_Match &= ~1 ;
35              }
36          }
37          __asm { bsf ecx, available_end_Match
38          mov jump_size, ecx } ;
39          available_end_Match >>= jump_size ;
40          index=0 ;
41          checked <<= jump_size ;
42      }
43  }
44
45
46
```

FIG. 7A

```
YY(P=p₁p₂...pₘT = t₁t₂...tₙ)
//Preprocessing:        W-LENGTH IN BITS OF COMP. WORD
for c∈Σ Do PatternBitMap[c] ← 1^(w-m)0^m
for j∈1...m Do PatternBitMap[pj] ← PatternBitMap[pⱼ] | 0^(w-m+j)10^(m-j-1)
// Initialize part:
position ← PatternSize — 1
available_end_Match ← ~0
checked ← 0
jump_size ← 0
index ← 0
//Searching part:
    while ( (position += jump_size) <= textSize - 1 ) Do
        available_end_Match ← available_end_Match &PatternBitMap[ text[position]]
        checked ← checked |( 1 << index)
        while (available_end_Match&1) Do
            index ← index + 1
            if (index < PatternSize)
            Then
                if (!( checked & (1<<index)))
                Then
                    available_end_Match &= PatternBitMap[ text[position—
                    index] ] >> index ;
                    checked |= 1<<index ;
                End of if
            Else
                reportMatch(str·,text,position-PatternSize+1,j) ;
                available_end_Match &= ~1 ;

End of if
            _asm { bsf ecx, available_end_Match
            mov jump_size, ecx )
            available_end_Match >>= jump_size
            index=0
            checked = checked << jump_size
        End of While
    End of While
```

FIG. 7B

SYSTEM AND METHOD FOR BIT-MAP BASED KEYWORD SPOTTING IN COMMUNICATION TRAFFIC

FIELD OF THE DISCLOSURE

The present disclosure relates generally to data processing, and particularly to methods and systems for textual search.

BACKGROUND OF THE DISCLOSURE

Keyword searching techniques are used in a wide variety of applications. For example, in some applications, communication traffic is analyzed in an attempt to detect keywords that indicate traffic of interest. Some data security systems attempt to detect information that leaks from an organization network by detecting keywords in outgoing traffic. Intrusion detection systems sometimes identify illegitimate intrusion attempts by detecting keywords in traffic.

Various string matching techniques are described, for example, by Navarro and Raffinot, in "Flexible Pattern Matching in Strings—Practical On-Line Search Algorithms for Texts and Biological Sequences," Cambridge University Press, 2002, which is incorporated herein by reference. Chapter 2 of this book reviews string matching algorithms such as Knuth-Morris-Pratt (KMP), Boyer-Moore, Horspool, Backward Non-deterministic Dawg Matching (BNDM) and Backward Oracle Matching (BOM).

SUMMARY OF THE DISCLOSURE

An embodiment that is described herein provides a method for searching a text that includes a sequence of symbols for occurrences of a pattern of the symbols, using a sequence of evaluations at respective positions in the text. The method includes performing a first evaluation of whether the pattern occurs in a current position in the text. If the pattern does not occur in the current position, a size of a jump to a subsequent position in the text is calculated based on results of the first evaluation. A second evaluation of whether the pattern occurs in the subsequent position in the text is performed.

In some embodiments, calculating the size of the jump includes computing the size of the jump based on the results of the first evaluation and of one or more previous evaluations that precede the first evaluation. In an embodiment, performing the first evaluation includes positioning the pattern so as to end at the current position in the text, comparing the symbols of the pattern to the corresponding symbols of the text while progressing from an end to a beginning of the pattern, and, upon finding a mismatch between the pattern and the text, calculating the jump to the subsequent position depending at least on the mismatch.

In some embodiments, the symbols are selected from an alphabet including alphabet symbols, the method includes computing for the alphabet symbols respective bit-maps, such that bit values of the bit-map of the alphabet symbol indicate respective symbol positions of the pattern in which the alphabet symbol occurs, and performing the first and second evaluations includes making the evaluations using the bit-maps.

In an embodiment, performing the first evaluation includes evaluating all the offsets from the current position in the text using the bit-maps of the symbols found in the text at the respective offsets. Evaluating the offsets may include accumulating, using the bit-maps, information regarding one or more of the positions in which the pattern cannot occur, and calculating the size of the jump to the subsequent position based on the accumulated information. In another embodiment, the pattern includes a wild-card symbol at a given bit position, and calculating the bit-maps includes setting the bits at the given bit position in all the bit-maps.

In yet another embodiment, performing the first evaluation includes updating a data structure that indicates the positions in the text in which the pattern cannot occur, and calculating the size of the jump includes computing the size of the jump based on the updated data structure.

In still another embodiment, performing the first evaluation includes updating a data structure that indicates, for each symbol in the text, whether that symbol was previously read from the text, and performing the first evaluation includes reading a given symbol from the text during the second evaluation only if the data structure indicates that the given symbol was not previously read from the text. In an embodiment, performing the second evaluation includes outputting an indication of a match upon successfully matching the pattern to the text at the subsequent position.

There is additionally provided, in accordance with an embodiment that is described herein, an apparatus for searching a text that includes a sequence of symbols for occurrences of a pattern of the symbols, using a sequence of evaluations at respective positions in the text. The apparatus includes a memory, which is configured to store the text, and a processor. The processor is configured to hold the pattern to be found in the text, to perform a first evaluation of whether the pattern occurs in a current position in the text, to calculate, if the pattern does not occur in the current position, a size of a jump to a subsequent position in the text based on results of the first evaluation, and to perform a second evaluation of whether the pattern occurs in the subsequent position in the text.

The present disclosure will be more fully understood from the following detailed description of the embodiments thereof, taken together with the drawings in which:

BRIEF DESCRIPTION OF THE DRAWINGS

FIGS. 7A and 7B are diagrams listing program code that implements a method for keyword searching, in accordance with an embodiment that is described herein.

DETAILED DESCRIPTION OF EMBODIMENTS

Overview

Figure 1:
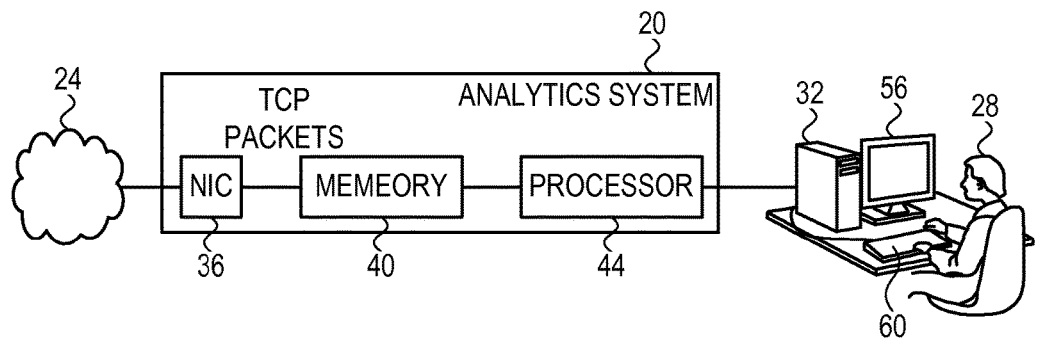
FIG. 1 is a block diagram that schematically illustrates a system for keyword searching, in accordance with an embodiment that is described herein.

Embodiments that are described herein provide improved methods and systems for locating occurrences of a search pattern in a body of text. The disclosed techniques can be used, for example, for identifying keywords or key phrases in monitored communication traffic, or for various other purposes.

In the disclosed embodiments, a processor searches the text for one or more occurrences of a pattern. Both the text and the pattern comprise symbols of some alphabet. In preparation for the search, the processor defines a respective bit-map for each alphabet symbol. In the bit-map corresponding to a given alphabet symbol, the bit positions of "1" values indicate the symbol positions in the pattern in which the alphabet symbol occurs.

Using the bit-maps, the processor carries out a highly efficient process of searching the text for occurrences of the pattern. Typically, the processor positions the pattern so as to end against a given position in the text. The processor then scans the pattern backwards using the bit-maps, symbol by symbol, attempting to match the symbols of the pattern to the corresponding symbols of the text. If a match is not found, the processor calculates the size of the jump to the next position in the text based on the accumulated results of the evaluations up to the current position.

In some embodiments, the processor maintains a data structure that indicates, for each symbol of the text, whether the pattern can possibly end at this symbol based on all information available so far. The processor updates the data structure during the search, and uses it to determine the size of the jump to the next position.

By using this data structure and the bit-maps, the processor is able to extract the maximal information from each text symbol, and to reuse the extracted information in subsequent positions of the pattern. In other words, the size of the jump to the next position in the text depends on information that originates not only from the current position, but also from one or more previous positions. This technique enables the processor to set large jumps between pattern positions, without risk of missing occurrences of the pattern.

In some embodiments, the processor performs the search process while reading each text symbol at most once. In an example embodiment, the processor maintains a data structure that indicates, for each text symbol, whether the text symbol was previously read or not. When evaluating the pattern at some position in the text, the processor reads a given text symbol only if the data structure indicates that the symbol was not previously read. Otherwise, the text symbol is skipped.

By reusing information across different positions of the pattern, the search process described herein achieves extremely large jumps between subsequent positions of the pattern. As a result, search speed is increased considerably. By reading each text symbol at most once, the search is faster and incurs less computational complexity.

Moreover, the additional memory space required by the disclosed search process is determined by the pattern size and the alphabet size, and does not depend on the text size. The preparation time (e.g., calculation of the bit-maps) usually depends only on the pattern size. Thus, the disclosed techniques are highly efficient for large bodies of text. Moreover, the disclosed techniques require only a small part of the text to be available at any given time, a property that is desirable, for example, in streaming applications. The number of bits retained in the streaming data, per stream, can be reduced to the number of symbols in the pattern. The bit-map scheme is also applicable in a straightforward manner to patterns that comprise wild-card symbols.

System Description

FIG. 1 is a block diagram that schematically illustrates a system 20 for keyword spotting, in accordance with an embodiment that is described herein. System 20 receives communication traffic from a communication network 24, and attempts to detect in the traffic predefined textual phrases, also referred herein to as keywords, strings or patterns. When one or more keywords are detected, the system reports the detection to a user 28 using an operator terminal 32.

System 20 can be used, for example, in an application that detects data leakage from a communication network. In applications of this sort, the presence of one or more keywords in a data item indicates that this data item should not be allowed to exit the network. Alternatively, system 20 can be used in any other suitable application in which input data is searched for occurrences of keywords, such as in intrusion detection and prevention systems, detection of spam in electronic mail (e-mail) systems, or detection of inappropriate content using a dictionary of inappropriate words or phrases.

Although the embodiments described herein refer mainly to processing of communication traffic, the disclosed techniques can also be used in other domains. For example, system 20 can be used for locating data of interest on storage devices, such as in forensic disk scanning applications. Certain additional aspects of keyword spotting are addressed, for example, in U.S. patent application Ser. No. 12/792,796, entitled "Systems and methods for efficient keyword spotting in communication traffic," which is assigned to the assignee of the present patent applications and whose disclosure is incorporated herein by reference. Other applications may comprise, for example, pattern matching in gene sequences in biology.

Network 24 may comprise any suitable public or private, wireless or wire-line communication network, e.g., a Wide-Area network (WAN) such as the Internet, a Local-Area Network (LAN), a Metropolitan-Area Network (MAN), or a combination of network types. The communication traffic, to be used as input data by system 20, may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments suitable, for example, for data leakage prevention applications, but can also be used in other applications.

Typically, network 24 comprises an Internet Protocol (IP) network, and the communication traffic comprises IP packets. The description that follows focuses on Transmission Control Protocol Internet Protocol (TCP/IP) networks and TCP packets. Alternatively, however, the methods and systems described herein can be used with other packet types, such as User Datagram Protocol (UDP) packets. Regardless of protocol, the packets searched by system 20 are referred to herein generally as input data.

In the example of FIG. 1, system 20 comprises a Network Interface Card (NIC) 36, which receives TCP packets from network 24. NIC 36 stores the incoming TCP packets in a memory 40, typically comprising a Random Access Memory (RAM). A processor 44 searches the TCP packets stored in memory 40 and attempts to identify occurrences of predefined keywords in the packets.

When processor 44 detects a given keyword in a given packet, it reports the detection to user 28 using an output device of terminal 32, such as a display 56. For example, the processor may issue an alert to the user and/or present the data item (e.g., packet or session) in which the keyword was detected. In some embodiments, processor 44 may take various kinds of actions in response to detecting a keyword.

For example, in a data leakage or intrusion prevention application, processor 44 may block some or all of the traffic upon detecting a keyword. User 28 may interact with system 20 using an input device of terminal 32, e.g., a keyboard 60.

The system configuration shown in FIG. 1 is an example configuration, which is chosen purely for the sake of conceptual clarity. Alternatively, any other suitable system configuration can be used. Generally, the different elements of system 20 may be carried out using software, hardware or a combination of hardware and software elements. In some embodiments, processor 44 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Bit-Map Based Search Method

The search problem addressed herein can be written formally as the task of finding one or more occurrences (e.g., the first occurrence or all occurrences) of a string or pattern P=[p1,p2, . . . ,pm] in a body of text T=[t1,t2, . . . ,tn]. In the disclosed embodiments, m<w, wherein w denotes the word size used in processor 44, in bit units.

Figure 2:
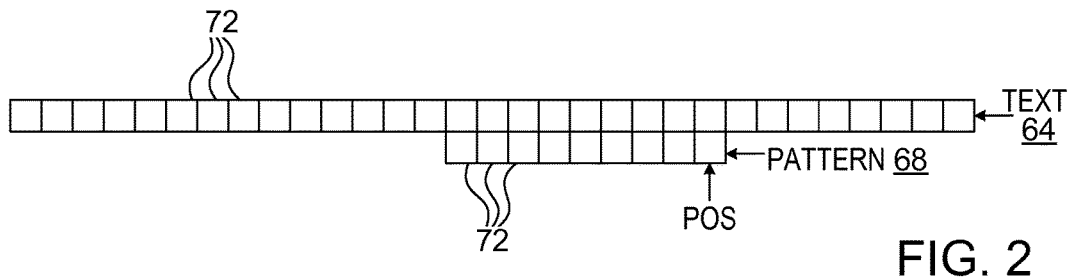
FIG. 2 is a diagram that schematically illustrates searched text and a search pattern, in accordance with an embodiment that is described herein.

FIG. 2 is a diagram that schematically illustrates a text 64 to be searched and a search pattern 68, in accordance with an embodiment that is described herein. The text and pattern each comprises a sequence of symbols or characters 72. In some embodiments symbols 72 are binary, i.e., can take the values "1" or "0". Generally, however, the symbols may be alphanumerical, or they may be selected from any other suitable alphabet. In gene matching applications, for example, the text and pattern are quaternary, and each symbol 72 may take the value "A" (Adenine), "T" (Thymine), "C" (Cytosine) or "G" (Guanine).

The disclosed search process, carried out by processor 44, begins by positioning pattern 68 at a certain position (denoted POS) in text 64, and checking whether the symbols of the pattern match the corresponding symbols of the text in this position. If a match is not detected, the pattern is moved to a different position in the text and a match is checked again. POS denotes the position in the text that is currently compared with the last symbol in the pattern.

For a given POS, the matching process starts from the end of the pattern and progresses backwards, attempting to evaluate whether it is possible that the pattern ends at position POS. If the current position POS is ruled out at any stage of the evaluation, the next value of POS is set based on all the information gathered during evaluation of the current POS. The matching and position updating processes are described in detail below.

Let $\Sigma$=(a,b,c, . . . ) denote the alphabet from which symbols 72 are selected. In some embodiments, processor derives from pattern 68 multiple bit-maps (i.e., binary strings), one bit-map for each alphabet symbol. The set of bit-maps is denoted B, and the bit-map of alphabet symbol x is denoted B(x).

Assuming the symbol at position POS of text 64 is x, the $i^{th}$ bit of B(x) (beginning at i=0) indicates whether symbol x appears in the $i^{th}$ symbol position in pattern 68. Processor 44 typically derives the bit-maps from the pattern in a pre-processing stage, before starting the search.

Figure 3:
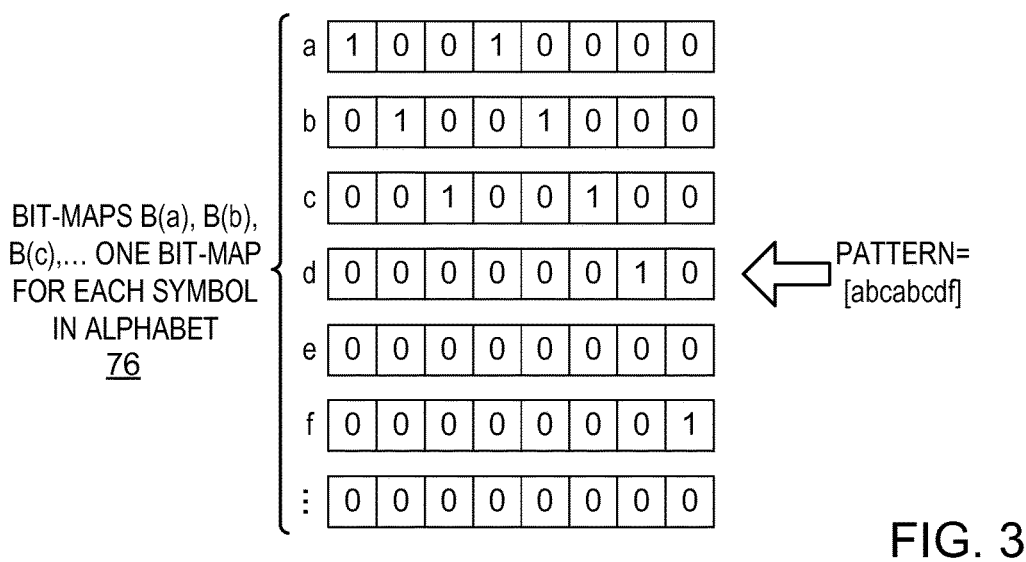
FIG. 3 is a diagram that schematically illustrates bit-maps used in a method for keyword searching, in accordance with an embodiment that is described herein.

FIG. 3 is a diagram that schematically illustrates bit-maps used in a method for keyword searching, in accordance with an embodiment that is described herein. The figure shows a set of bit-maps 76 derived by processor 44 for the pattern [abcabcdf].

Consider, for example, the bit-map of symbol "f", which is [00000001]. According to this bit-map, the symbol "f" appears only once in the pattern, in the eighth symbol position in the pattern. As another example, consider the bit-map of symbol "c", which is [00100100]. According to this bit-map, the symbol "c" appears in the pattern twice, in the third and sixth symbol positions. For alphabet symbols that do not appear at all in pattern 68, the bit-maps are naturally all "0".

The bit-map structure described above enables processor 44 to extract from the text symbol at position POS the maximal possible information regarding occurrences of the pattern. Thus, if the current position POS is ruled out as a possible occurrence of pattern 68, the bit-maps enable processor 44 to set the next value of POS with the maximum possible jump size that will not miss the next possible occurrence of the pattern. A search process that uses this feature is described next.

In an embodiment, the bit-map structure B can support the use of wild-card characters in pattern 68. For example, if the $i^{th}$ symbol in pattern 68 is a "?" wild-card character (a character that matches any single symbol), processor 44 may set the $i^{th}$ bit of all bit-maps B(x) in B to "1".

In some embodiments, processor 44 uses a binary vector denoted A whose length is on the order of the size of pattern 68. Vector A accumulates the currently available information as to the possible occurrences of pattern 68 in text 64. Processor 44 uses vector A in conjunction with bit-maps 76 to calculate the jump size between evaluated positions in the text.

Figure 4:
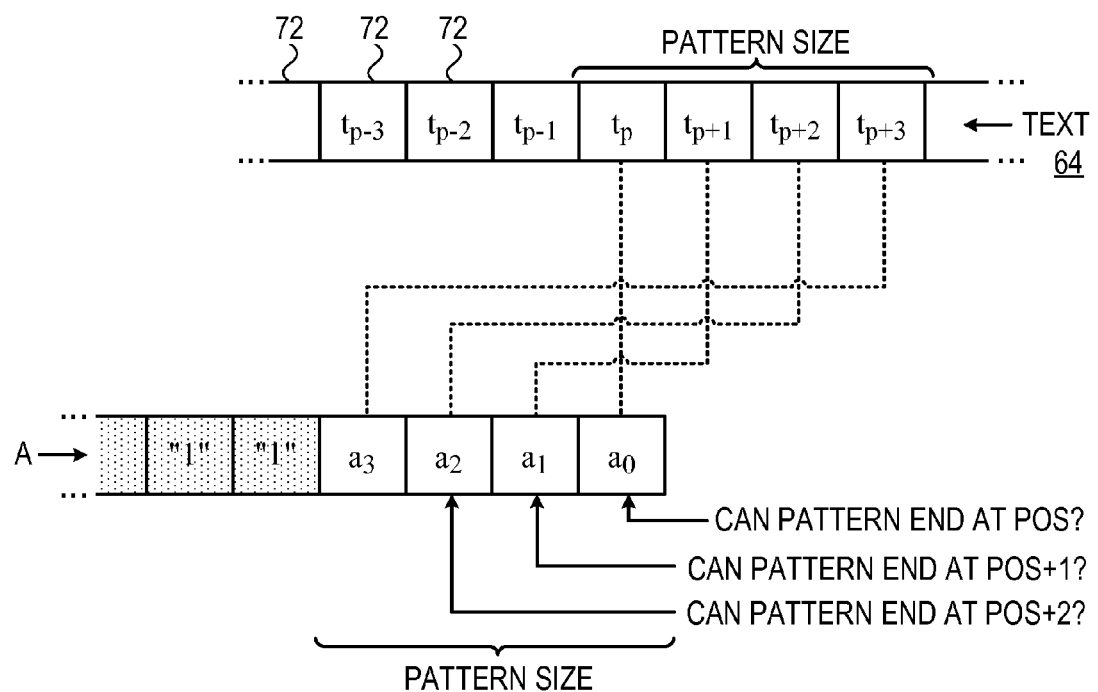
FIG. 4 is a diagram that schematically illustrates a process of accumulating information during a keyword searching process, in accordance with an embodiment that is described herein.

FIG. 4 is a diagram that schematically illustrates the use of vector A in accumulating information during the search process, in accordance with an embodiment that is described herein. The searched text is shown at the top of the figure, and vector A is shown at the bottom of the figure.

At any given time during the search process, when processor 44 evaluates a position POS in the text for a possible match with pattern 68, a "1" bit value at a certain bit position in A indicates that pattern 64 may possibly end at the corresponding offset from POS in text 64. A "0" bit value in a certain bit position of vector A indicates that it was already found that pattern 64 cannot end at that offset from POS in the text.

Figure 5:
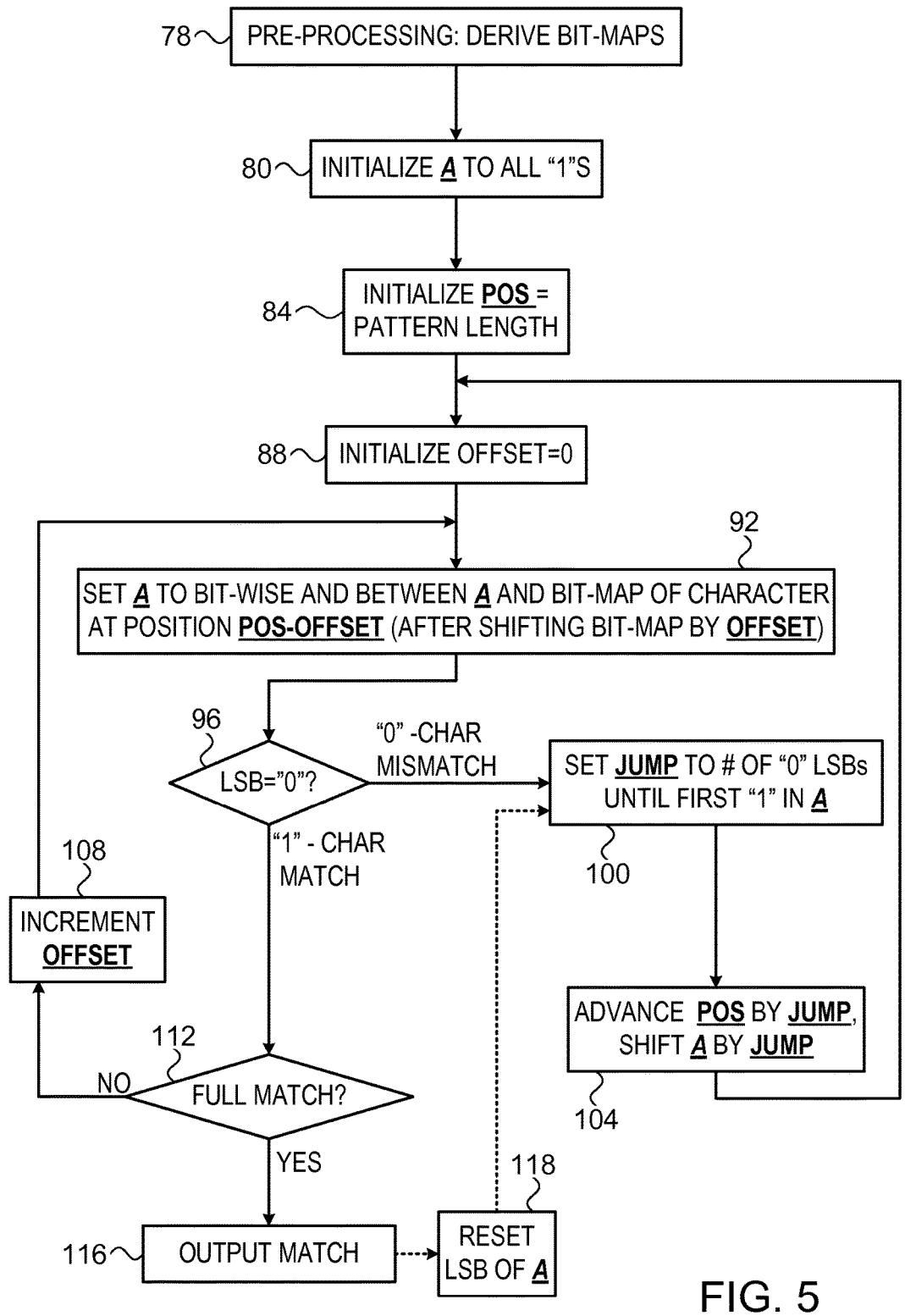
FIG. 5 is a flow chart that schematically illustrates a method for keyword searching, in accordance with an embodiment that is described herein.

FIG. 5 is a flow chart that schematically illustrates a method for keyword searching, in accordance with an embodiment that is described herein. At an A initialization step 80, processor 44 initializes A to all "1"s, to indicate that no occurrences have been ruled-out so far. At a POS initialization step 84, processor 44 initializes POS to some initial value. Typically, the initial value of POS will be the size of pattern 68, since POS corresponds to the end of the pattern.

At an offset initialization step 88, processor 44 initializes a variable denoted OFFSET to zero. This variable marks the offset relative to POS that is currently evaluated. For example, when OFFSET=2, processor 44 evaluates the entire possible impact of the text symbol at position POS-2 in the text. After these initialization steps, the main loop of the search process begins.

In each main loop iteration, processor 44 reads the symbol at position POS-OFFSET in text 64 and evaluates, based on the read text symbol, the possible offsets from POS (POS, POS+1, POS+2, . . . ) in which pattern 68 may end in the text.

The loop iteration begins with a vector A updating step 92. In this step, processor 44 calculates a bit-wise AND between the current value of A and the bit-map (76) of the symbol read from position POS-OFFSET in the text. In this bit-wise operation, the bit-map is first shifted by OFFSET to the right. The bit-wise operation is performed between the shifted bit-map and A, i.e., the shifted bit-map is right-aligned with A. Processor 44 substitutes the result of the bit-wise AND operation back into A.

At this point, if the right-most bit (the Least Significant Bit—LSB) of A is "0", then pattern 68 cannot end at position POS in the text. (If A has a run of k "0" LSBs, then pattern 68 cannot end at POS, POS+1, . . . ,POS+k−1.) If, on the other hand, the LSB of A is "1", this means that all the OFFSET+1 symbols evaluated so far indicate that it is possible for the pattern to end at POS.

Processor 44 checks the LSB of A, at an LSB checking step 96. If the LSB of A is "0", then processor 44 prepares to re-position pattern 68 at a higher value of POS. Processor 44 calculates a value denoted JUMP, which gives the size of the increase in POS value, i.e., the size of the jump to the next position in text 64 to be compared to pattern 68.

In this embodiment, processor 44 sets the value of JUMP to be the number of "0" LSBs in vector A until the first "1" bit value. This JUMP is the highest possible increase in POS that will not miss any possible occurrence of pattern 68, based on the maximal information that can be extracted from positioning the pattern at position POS.

Processor 44 increments POS by JUMP, and also shifts A to the right by JUMP, at a repositioning step 104. The method then loops back to step 88 above in which processor 44 begins to evaluate the next position of the pattern against the text.

If, on the other hand, the LSB of A at step 96 is "1", then processor 44 checks whether all possible offsets (up to the pattern size) have been evaluated. If so, processor 44 concludes that pattern 68 occurs at position POS in the text, and reports this result, at a reporting step 116.

If the objective of the search is only to find the first occurrence of pattern 68, the method terminates at this point. Otherwise, e.g., if the objective of the search is to find all the occurrences of pattern 68 in text 64, the method continues to scan the text in a similar manner. For example, in such a case processor 44 may reset the LSB of A to "0", at a resetting step 118, and then jump to step 100.

If step 112 indicates that not all possible offsets (up to the pattern size) have been evaluated, processor 44 increments OFFSET by one, at an incrementing step 108, and the method loops back to step 92 to test the next OFFSET value.

It is important to note the role of vector A in retaining valuable information across jumps from one POS to another. Vector A is not reset at any stage of the process. Therefore, unless the size of JUMP is on the order of the pattern size, A conveys valuable information that is used by processor 44 in evaluating the new POS. For example, a certain bit of A may be set to "0" at step 92 of some POS value, and this value may be used to force a jump or increase the JUMP size (step 96 or 100) in a subsequent POS.

The flow of operations shown in FIG. 5 is an example flow, which is depicted purely for the sake of conceptual clarity. In alternative embodiments, any other suitable flow can be used for implementing the disclosed techniques. For example, each bit in bit-map B(x) may represent a respective group of two or more symbols instead of a single symbol.

As another example, if processor 44 identifies in text 64 (where offset=0), a symbol that does not appear at all in pattern 68, the processor may set JUMP to the maximal value, i.e., the pattern size, without further verifications. When performing the maximal jump to the next POS, the processor may re-initialize vector A to all "1"s. When using this feature, there is no need to perform the logical "AND" and search for the right-most "1" in A.

An alternative technique of representing the bit-maps is using indices. In other words, processor 44 may represent each bit-map 76 using one or more indices that indicate which bit positions are "1" and which are "0". This technique is useful, for example, for representing a pattern whose number of symbol is larger than the word size w of processor 44. Alternatively, processor 44 may represent the bit-maps in any other suitable way.

As yet another example, when carrying out the method of FIG. 5, processor 44 does not necessarily have to update vector A on every individual symbol. In an example embodiment, processor 44 may accumulate two or more updates and apply them together to the vector. The update can also be done as part of the preprocessing step, for every certain number of match symbols (following mismatch with the next symbol).

Algorithm Enhancement for Reading Each Text Symbol at Most Once

Figure 6:
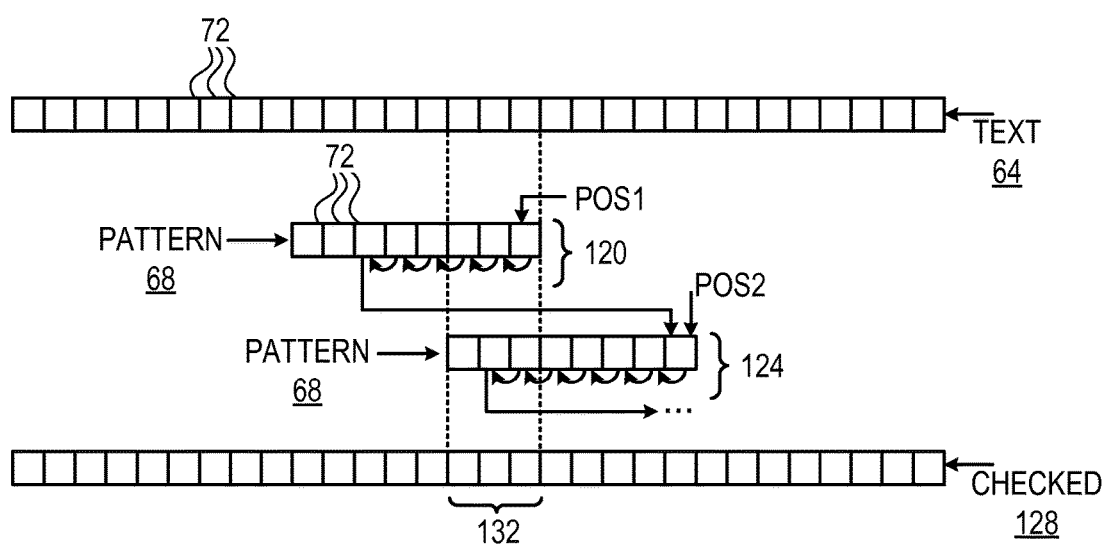
FIG. 6 is a diagram that schematically illustrates a keyword searching process, in accordance with an embodiment that is described herein.

FIG. 6 is a diagram that schematically illustrates an example operation of the keyword searching process of FIG. 5 above, in accordance with an embodiment that is described herein. At a certain point in time, pattern 68 is positioned at a position POS1 in the text. Processor 44 evaluates this POS value at a first search phase 120. As part of this process, as explained above, processor 44 checks increasing values of OFFSET, i.e., positions in the text that gradually decrease (move to the left) from POS1. Evaluation of each OFFSET value involves reading the text symbol at position POS1-OFFSET.

As some stage, possible occurrences at POS1 are ruled out, and processor 44 decides to jump to a new POS value denoted POS2. AT POS2 processor 44 carries out a second search phase 124. In the present example, the jump size is less than the pattern size (pattern size is 8, while JUMP=5). Thus, unless accounted for, one or more text symbols that were read during phase 120 will be read again during phase 124.

In the example of FIG. 6, the three text symbols in an interval 132 will be read twice, because of the overlap in the pattern between search phase 120 and search phase 124. The extra readout of the text symbols in interval 132 is unnecessary, because vector A (which is not reset throughout the search process) retains the information gathered using these symbols.

Thus, in some embodiments processor 44 records the text symbols that were already read, and uses this record to skip them in subsequent POS values. In an example embodiment, processor 44 maintains a binary vector 128 denoted "CHECKED", or C for brevity. Each bit of vector C corresponds to a respective symbol in text 64, and indicates whether this text symbol was read already or not. (Nevertheless, vector C does not have to be of the same size as the text. Typically, vector C is on the order of the pattern size, and the bit positions in C correspond to the symbols of text 64 at respective offsets from the current POS.) In an example embodiment, the $i^{th}$ bit of C is "0" if the symbol of text 64 was not read before, and "1" if the symbol was already read.

When carrying out search phase 124 (using POS2), before reading the text symbol at position POS2-OFFSET (step 92 of FIG. 5), processor 44 checks the corresponding element of vector C to make sure this text symbol is read for the first time. If the text symbol was read already, processor 44 skips it and increments OFFSET. In the notation of FIG. 5, processor 44 skips steps 92-96 and jumps directly to step 108. Using this technique, processor 44 carries out the search process while reading each text symbol at most once. In some embodiments, processor 44 may use a suitable efficient scheme for finding the right-most "0" in vector C without exhaustively scanning the vector elements.

Example Program Code

FIGS. 7A and 7B are diagrams listing program code that implements the above-described keyword searching process, in accordance with an embodiment that is described herein. It is noted that this program code is given purely by way of example, and any other suitable code can be used in alternative embodiments. In the program code, bit-maps B are denoted PatternBitMap, vector A is denoted available end Match, POS is denoted position, OFFSET is denoted index, C is denoted checked, and JUMP is denoted jump size.

Although the embodiments described herein mainly address text search applications, the principles of the present disclosure can also be used in other pattern matching applications, such as, for example, matching of gene sequences in biology.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for searching a text that comprises a sequence of symbols for occurrences of a pattern of the symbols, using a sequence of evaluations at respective positions in the text, the method comprising:
performing a first evaluation of whether the pattern occurs in a current position in the text, wherein the performing comprises:
positioning the pattern so as to end at the current position in the text,
comparing the symbols of the pattern to the corresponding symbols of the text while progressing from an end to a beginning of the pattern, and
upon finding a mismatch between the pattern and the text, calculating the jump to the subsequent position depending at least on the mismatch;
if the pattern does not occur in the current position, calculating a size of a jump to a subsequent position in the text based on results of the first evaluation; and
performing a second evaluation of whether the pattern occurs in the subsequent position in the text.

2. The method according to claim 1, wherein calculating the size of the jump comprises computing the size of the jump based on the results of the first evaluation and of one or more previous evaluations that precede the first evaluation.

3. The method according to claim 1, wherein the symbols are selected from an alphabet comprising alphabet symbols, and comprising computing for the alphabet symbols respective bit-maps, such that bit values of the bit-map of the alphabet symbol indicate respective symbol positions of the pattern in which the alphabet symbol occurs, and wherein performing the first and second evaluations comprise making the evaluations using the bit-maps.

4. The method according to claim 3, wherein performing the first evaluation comprises evaluating all the offsets from the current position in the text using the bit-maps of the symbols found in the text at the respective offsets.

5. The method according to claim 4, wherein evaluating the offsets comprises accumulating, using the bit-maps, information regarding one or more of the positions in which the pattern cannot occur, and calculating the size of the jump to the subsequent position based on the accumulated information.

6. The method according to claim 3, wherein the pattern comprises a wild-card symbol at a given bit position, and wherein calculating the bit-maps comprises setting the bits at the given bit position in all the bit-maps.

7. The method according to claim 1, wherein performing the first evaluation comprises updating a data structure that indicates the positions in the text in which the pattern cannot occur, and wherein calculating the size of the jump comprises computing the size of the jump based on the updated data structure.

8. The method according to claim 1, wherein performing the first evaluation comprises updating a data structure that indicates, for each symbol in the text, whether that symbol was previously read from the text, and wherein performing the first evaluation comprises reading a given symbol from the text during the second evaluation only if the data structure indicates that the given symbol was not previously read from the text.

9. The method according to claim 1, wherein performing the second evaluation comprises outputting an indication of a match upon successfully matching the pattern to the text at the subsequent position.

10. Apparatus for searching a text that comprises a sequence of symbols for occurrences of a pattern of the symbols, using a sequence of evaluations at respective positions in the text, the apparatus comprising:
a memory, which is configured to store the text; and
a processor, which is configured to:
hold the pattern to be found in the text,
perform a first evaluation of whether the pattern occurs in a current position in the text by positioning the pattern so as to end at the current position in the text and comparing the symbols of the pattern to the corresponding symbols of the text while progressing from an end to a beginning of the pattern, and, upon finding a mismatch between the pattern and the text, to calculate the jump to the subsequent position depending at least on the mismatch,
calculate, if the pattern does not occur in the current position, a size of a jump to a subsequent position in the text based on results of the first evaluation, and
perform a second evaluation of whether the pattern occurs in the subsequent position in the text.

11. The apparatus according to claim 10, wherein the processor is configured to calculate the size of the jump based on the results of the first evaluation and of one or more previous evaluations that precede the first evaluation.

12. The apparatus according to claim 10, wherein the symbols are selected from an alphabet comprising alphabet symbols, and wherein the processor is configured to compute for the alphabet symbols respective bit-maps, such that bit values of the bit-map of the alphabet symbol indicate respective symbol positions of the pattern in which the alphabet symbol occurs, and to perform the first and second evaluations using the bit-maps.

13. The apparatus according to claim 12, wherein the processor is configured to perform the first evaluation by evaluating all the offsets from the current position in the text using the bit-maps of the symbols found in the text at the respective offsets.

14. The apparatus according to claim 13, wherein the processor is configured to accumulate, using the bit-maps, information regarding one or more of the positions in which the pattern cannot occur, and to calculate the size of the jump to the subsequent position based on the accumulated information.

15. The apparatus according to claim 12, wherein the pattern comprises a wild-card symbol at a given bit position, and wherein the processor is configured to set the bits at the given bit position in all the bit-maps.

16. The apparatus according to claim 10, wherein the processor is configured, in performing the first evaluation, to update a data structure that indicates the positions in the text in which the pattern cannot occur, and to calculate the size of the jump using the updated data structure.

17. The apparatus according to claim 10, wherein, in performing the first evaluation, the processor is configured to update a data structure that indicates, for each symbol in the text, whether that symbol was previously read from the text, and to read a given symbol from the text during the second evaluation only if the data structure indicates that the given symbol was not previously read from the text.

18. The apparatus according to claim 10, wherein the processor is configured to output an indication of a match upon successfully matching the pattern to the text at the subsequent position.

\* \* \* \* \*